United States Patent [19]

Williman

[11] 4,403,192

[45] Sep. 6, 1983

[54] PRIORITY CIRCUIT FOR SERVICE REQUEST SIGNALS

[75] Inventor: Glenn S. Williman, Ocean, N.J.

[73] Assignee: The United States of America as represented by the Secretary of the Army, Washington, D.C.

[21] Appl. No.: 214,367

[22] Filed: Dec. 8, 1980

[51] Int. Cl.³ .................... G06F 9/46; H04Q 3/00
[52] U.S. Cl. .......................... 328/152; 328/116; 328/109; 307/357; 340/825.5
[58] Field of Search .................. 340/825.5, 825.1; 179/18 ET; 328/109, 116, 117, 152, 154; 307/514, 518, 357; 370/85, 86, 87, 88, 89, 90, 91, 92

[56] References Cited

U.S. PATENT DOCUMENTS 3,175,189 3/1965 Willyard et al. ............. 340/825.5
4,189,766 2/1980 Horiguchi et al. ............. 364/200

OTHER PUBLICATIONS

French, "Discriminator Delays First of Four Responses", *Electronics*, p. 123, Nov. 13, 1975.
R. A. Henle, "N-Way Priority Circuit", *IBM Tech. Discl. Bull.*, vol. 13, No. 10, pp. 2824-2825, Mar. 1971.

*Primary Examiner*—Larry N. Anagnos
*Assistant Examiner*—David R. Bertelson
*Attorney, Agent, or Firm*—Robert P. Gibson; Jeremiah G. Murray; John W. Redman

[57] ABSTRACT

An interlock arrangement in which each service request path comprises two inverter gates between an input and an output with a junction between the gates. Cross-coupling circuits are coupled from each junction to every other junction in each direction, each comprising an inverting gate in series with a diode. The diodes are normally reverse biased. A first to arrive request signal is forwarded to its output, and a later signal at any other input causes one diode to conduct and clamp the junction at its output, so that the signal is blocked from reaching the output until the first request signal returns to the inactive state.

3 Claims, 1 Drawing Figure

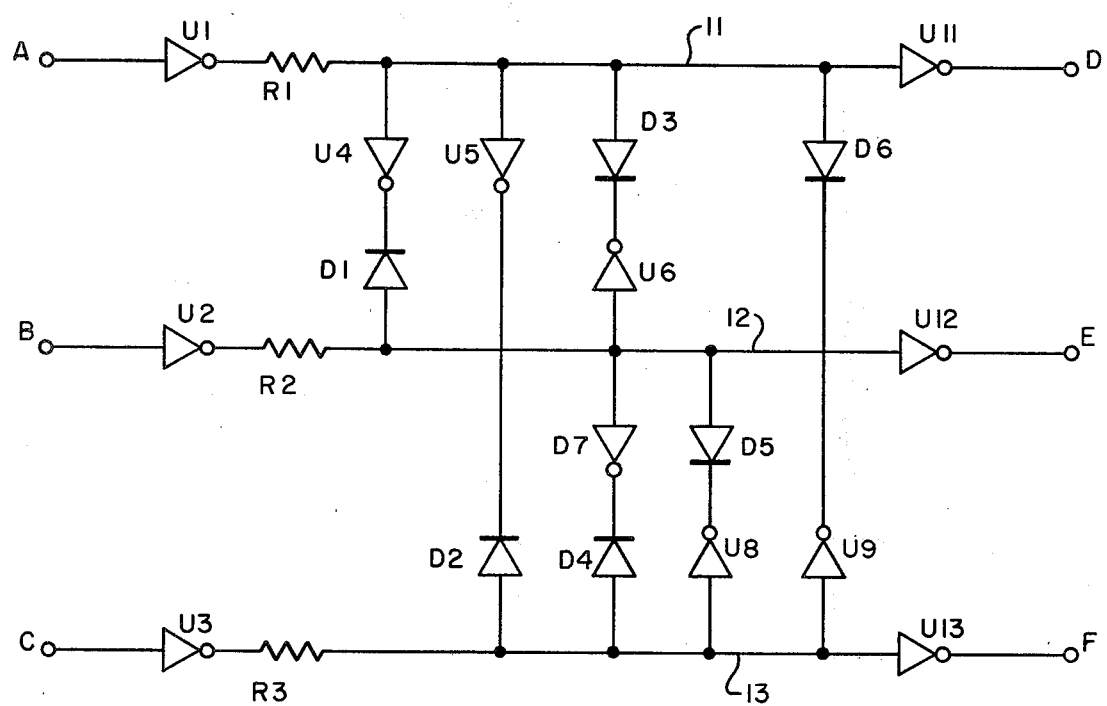

PRIORITY CIRCUIT FOR SERVICE REQUEST SIGNALS

GOVERNMENT LICENSE

The invention described herein may be manufactured and used by or for the Government for governmental purposes without the payment of any royalty thereon or therefor.

BACKGROUND OF THE INVENTION

This invention relates to an interlock, lockout, or priority circuit; or more particularly to a racing circuit which may select one of a number of request signals generated asynchronously by a plurality of processor units requesting the use of a common unit, thereby permitting the exclusive use of the common unit by one processor unit.

There are a number of situations in which one common unit is provided for servicing a number of other processing or peripheral units. In the telephone systems, one example is a translator serving a number of registers. In computer systems, a central processor may be arranged to accept input data from several peripheral units or terminals. Another example is a common bus or line onto which only one unit at a time is allowed to send signals. In general, each of the peripheral processing units is provided with means to generate a service request signal whenever it is ready to use the common unit. Several different arrangements have been used over the years for the common unit to recognize a service request and become associated with the calling unit for a period of time, while preventing requests from other units from interfering. One approach is to simply scan the service request leads, either continuously, or whenever at least one unit has an active request signal present. With other arrangements, as soon as an active request is present from one unit it is extended to the common processor, and the circuits are interconnected in a manner which blocks any request signals from other units being extended. These are known as interlock, lockout, or priority circuits. Often the active request signals become latched until a release or reset signal is received. Some examples of priority circuits are U.S. Pat. No. 3,581,108 to Eisenmengler for a Single Selecting Circuit Employing a Plurality of Interlocked Nor Gates, U.S. Pat. No. 4,189,766 to Homguchi et al for a Racing Circuit for Controlling Access of a Processor Units to a Common Device, and U.S. Pat. No. 3,772,651 to Thyssens for a Lock-Out Circuit.

SUMMARY OF THE INVENTION

The object of the invention is to provide a simple digital first-come first-served priority circuit.

According to the invention, each service request input lead is coupled via two inverting gates to a corresponding output lead, and the junction between the two inverting gates is connected via inverting gates and diodes to the similar junctions for all of the other service request leads; so that the first active request signal at an input appears uninverted at its corresponding output, and an active signal at any other input causes one of the diodes to conduct, which effectively blocks that signal from being extended to its output.

BRIEF DESCRIPTION OF THE DRAWING

The single FIGURE is a schematic diagram of a priority lock-out circuit.

DETAILED DESCRIPTION

The drawing shows a priority lockout circuit which may be coupled between three individual units and one common unit. The circuit may of course be expanded to serve any number of individual units working with the one common unit, but it is particularly useful when the number of individual units is not too great. The purpose of the invention is to determine which of several digital signals occurred first, transmit that signal, and block transmission of the other signals.

The three service request inputs from the individual units are designated A, B and C, and the corresponding outputs to the common unit are designated D, E and F respectively. The three inputs A, B and C are coupled via respective inverter gates U1, U2 and U3 and resistors R1, R2 and R3 to respective junctions 11, 12 and 13, and thence via respective inverter gates U11, U12 and U13 to the inputs D, E and F. The junction 11 is coupled to junction 12 via an inverter gate U4 in series with a diode D1, and to junction 13 via an inverter gate U5 in series with a diode D2. LIkewise junction 12 is coupled to junction 11 via inverter U6 and diode D3, and to junction 13 via inverter U7 and diode D4; and junction 13 is coupled to junction 12 via inverter U8 and diode D5, and to junction 11 via inverter U9 and diode D6. In general, if there are N service request inputs, there will be N(N-1) such coupling paths, each comprising an inverter gate in series with a diode.

The circuit acts on negative logic inputs, in which a voltage more negative than a threshold value is defined as "true" or "1", and a voltage more positive than the threshold value is a "false" or "0". Therefore all of the diodes D1–D6 have the cathode on the output side from the associated inverter gate, and are normally reverse biased. The three inputs A, B and C are normally high, or in the "0" level when there are no active service requests.

When service requests occur, whichever signal occurs first, A, B or C, will be transferred, univerted, to its corresponding output D, E or F, and transmission of other signals will be blocked. The circuit operates as follows. Assume that a serice request arrives first at input A. A negative pulse appearing at input A is inverted by gate U1. The resulting "0" level signal is inverted again to a "1" level at the outputs of inverter gates U4, U5 and U11, so that the intended signal at output D is true. Any finite time later, a negative pulse or "1" level signal appearing for example at input B will be inverted by gate U2. This causes diode D1 to conduct since signal B is positive at the anode of diode D1 with respect to the "1" level signal at its cathode from the output of inverter U4. The conduction of diode D1 clamps the current from signal B to force the potential at the input of inverter U12 to remain at the "1" level. Therefore the level at output E remains at "0". This essentially blocks the request signal at input B from reaching the output E. Resistors R1, R2 and R3 limit the current flow into inverter gates U4, U5, U6, U7, U8 and U9 when the associated diodes are forward biased. As soon as the signal at input A returns to a "0", if the request at input B is still active at the "1" level, output E becomes true, and later active signals at inputs A and C become blocked from reaching there respective outputs D and F. Note that no reset or release signal is required.

If both inputs B and C were to become true during the time that the first to arrive signal at input A was being transmitted at its output D as a true signal, outputs E and F would both be held at the "0" level. Then when the signal at input A became a "0", there would be a momentary instability, but only one of the two outputs E and F could become true, and the other would be blocked to remain false while awaiting its turn.

What is claimed is:

1. An interlock priority arrangement for a digital system having "1" and "0" logic levels comprising a plurality of service request circuit paths;

wherein each if said service request circuit paths comprises an input terminal followed by an input inverting gate and a resistor to a junction, and thence via an output inverting gate to an output terminal;

a plurality of cross-coupling circuits individually coupling each junction to every other junction in each direction, so that with N service request circuit paths these are N(N-1) cross-coupling circuits, each cross-coupling circuit comprising an inverting gate in series with a diode; said diodes being connected in the direction in which they are reverse biased when all of said input terminals are at the "0" logic level and therefore all of said junctions are at the "1" logic level and the outputs of the inverting gates of all of the cross-coupling circuits are at the "0" logic level;

the arrangement being operative in response to an active service request signal at the "1" logic level arriving at any one of said input terminals while the other input terminals are at the "0" logic level to change the corresponding junction to the "0" logic level and the corresponding output terminal to the "1" logic level, with all the cross-coupling circuits originating at that junction also having the outputs of their inverting gates at the "1" logic level, so that in response to a "1" level signal arriving at any other input terminal any finite time later while the first to arrive is still active, the diode in one cross-coupling circuit conducts to clamp the junction at its output side at the "1" level so that the latter service request signal is blocked and the corresponding output terminal remains at the "0" level;

all of the service request circuit paths becoming unblocked immediately in response to the first signal returning to the "0" level at the input and output terminals of the corresponding service request circuit paths.

2. An interlock priority arrangement according to claim 1, wherein said "1" logic level is a negative potential with respect to the "0" logic level, and said diodes each have a cathode terminal connected to the output of the inverting gate in the same cross-coupling circuit and an anode terminal connected to the junction which is at the output of the cross-coupling circuit.

3. An N-input, N-output digital logic circuit consisting of:

N-input circuit means for conditioning a desired input logic signal for transmission to an associated one output means;

N-output circuit means for receiving a logic signal from an associated input means for conditioning a desired output logic signal; and intermediate circuit means for interconnecting each said associated N-input and N-output circuit means for preventing any other associated input and output circuit means from transmitting and conditioning a signal of the desired logic level during the period of time when the desired logic level has individually appeared at the input of one of said input circuit means and comprising an inverter means for conditioning the output of each respective input circuit means, said inverter means serially connected to respective diode means for clamping the other of said associated input and output circuit means when said one input circuit means is transmitting said desired logic level.

* * * * *